F. E. WATTS.
PROPELLER SHAFT.
APPLICATION FILED DEC. 8, 1914.
1,153,984.
Patented Sept. 21, 1915.
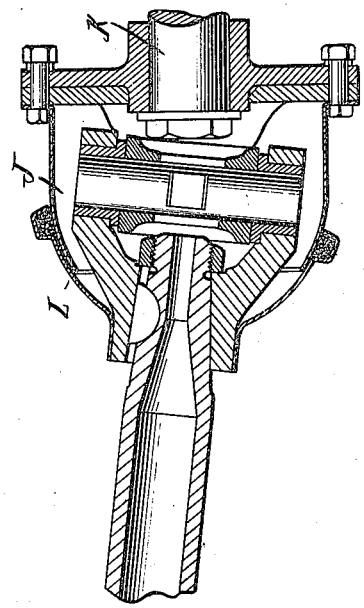
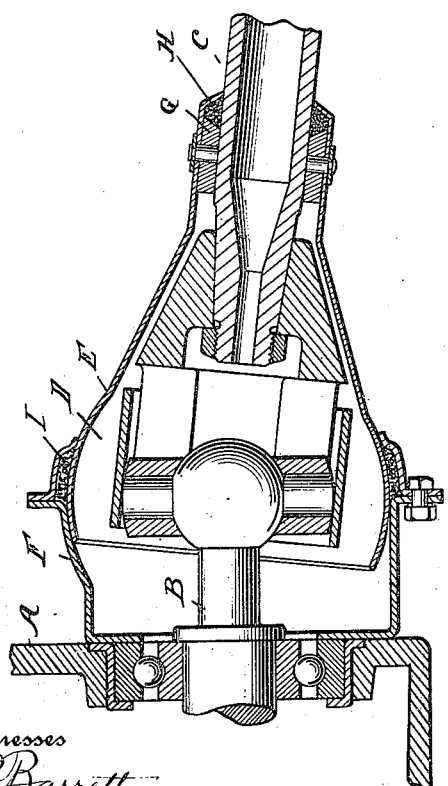
Witnesses
E. R. Barrett
W. K. Ford
Inventor
Frank E. Watts
By
Attorneys

UNITED STATES PATENT OFFICE.

FRANK E. WATTS, OF DETROIT, MICHIGAN, ASSIGNOR TO HUPP MOTOR CAR COMPANY, OF DETROIT, MICHIGAN, A CORPORATION OF MICHIGAN.

PROPELLER-SHAFT.

1,153,984.

Specification of Letters Patent.     Patented Sept. 21, 1915.

Application filed December 8, 1914. Serial No. 876,104.

*To all whom it may concern:*

Be it known that I, FRANK E. WATTS, a citizen of the United States of America, residing at Detroit, in the county of Wayne and State of Michigan, have invented certain new and useful Improvements in Propeller-Shafts, of which the following is a specification, reference being had therein to the accompanying drawings.

The invention relates to propeller shafts for automobiles or the like, and has among the objects thereof to provide a novel construction of propeller shaft which will act to carry the lubricant from the forward universal joint to the rear universal joint.

The invention resides in the peculiar construction, arrangement and combination of parts as will be more fully hereinafter set forth.

In the drawings, the figure is a longitudinal sectional view through a propeller shaft embodying the invention.

A designates the transmission case of an automobile or similar vehicle, and B is the end of the transmission shaft. The end B projects without the end of the casing and is connected to the propeller shaft C by means of a universal joint D. The latter is inclosed within a housing composed of sections E and F having their meeting ends connected together to permit universal movement. The section F is attached to the end of the casing A, while the section E carries a bearing G through which the shaft C extends.

H is a suitable packing for the bearing G to prevent lubricant from the housing leaking past the bearing G, and I is an oil-tight packing between the sections E and F.

The lower end of the propeller shaft C is attached by means of a universal joint J to a shaft K that drives a differential or other gearing on the rear axle. The joint J also is inclosed within a housing L composed of sections connected together for universal movement.

It is of course, desirable to lubricate both the universal joints D and J. The universal joint D receives lubricant from the transmission casing, and in order to provide a simple manner of supplying lubricant to the rear universal joint J, the propeller shaft as shown is made hollow and has the opposite ends communicating respectively with the casings D and L. Sufficient lubricant passes from the transmission case into the housing for the joint D to properly lubricate the latter, and during the rotation of the shaft a certain amount of lubricant is splashed and thrown by centrifugal action into the open upper end of the propeller shaft. Since the propeller shaft is downwardly-inclined, oil entering the upper end of the shaft will flow by gravity to the casing L and lubricate the joint J.

The arrangement just described is a very simple manner of effecting a lubrication of the rear universal joint, since no additional parts are required, for it is usual to inclose the universal joints in housings.

What I claim as my invention is:—

The combination with two rotating members, of an inclined hollow shaft transmitting rotation between said members, universal joints between said members and said hollow shaft, and housings respectively inclosing said joints, the passage through the shaft having direct communication through the shaft extremities with said housings, the inclination of the hollow shaft being utilized to produce a flow of lubricant from the upper to the lower housing.

In testimony whereof I affix my signature in presence of two witnesses.

FRANK E. WATTS.

Witnesses:
    DON T. HASTINGS,
    GRANVILLE C. ALDRICH.